United States Patent [19]

Brax

[11] 3,873,418

[45] Mar. 25, 1975

[54] METHOD OF RECOVERING NOIL FIBRES AND SOLUBLE WOOD MATERIAL FROM WASTE WATER

[75] Inventor: Esko Kai Brax, Helsinki, Finland

[73] Assignee: Savo Oy, Kuopio, Finland

[22] Filed: Feb. 29, 1972

[21] Appl. No.: 230,515

Related U.S. Application Data

[63] Continuation-in-part of Ser. No. 9,937, Feb. 9, 1970, abandoned.

[52] U.S. Cl. .................. 162/190, 162/264, 210/53
[51] Int. Cl. ............................................. D21f 1/66
[58] Field of Search ........ 162/190, 264; 210/52, 53, 210/54

[56] References Cited
UNITED STATES PATENTS

| | | | |
|---|---|---|---|
| 1,672,584 | 6/1928 | Travers | 210/52 X |
| 2,771,823 | 11/1956 | Lukemire | 162/190 |
| 2,937,143 | 5/1960 | Goren | 210/52 |
| 2,980,609 | 4/1961 | House et al. | 162/190 X |
| 3,130,167 | 4/1964 | Green | 210/52 X |
| 3,165,465 | 1/1965 | Ray et al. | 210/53 |
| 3,171,801 | 3/1965 | Rice et al. | 210/53 X |
| 3,256,141 | 6/1966 | Stephenson | 162/190 |
| 3,262,877 | 7/1966 | Compte, Jr. | 162/190 X |
| 3,516,932 | 6/1970 | Hedrick et al. | 210/53 |

*Primary Examiner*—S. Leon Bashore
*Assistant Examiner*—Alfred D'Andrea, Jr.
*Attorney, Agent, or Firm*—Brooks Haidt & Haffner

[57] ABSTRACT

Noil fibres and wood material which has dissolved or is becoming dissolved in white water from wood processing industries are recovered and used as additional raw material, and resulting clarified water is recycled for use as fabrication water. The pH of water is controlled during the recovery process and the material to be recovered is caused to agglomerate by the addition of agents whose presence in the final product is beneficial. A polyelectrolyte or the like can be added to enhance flock formation.

6 Claims, No Drawings

METHOD OF RECOVERING NOIL FIBRES AND SOLUBLE WOOD MATERIAL FROM WASTE WATER

CROSS REFERENCE TO RELATED APPLICATION

This application is a continuation-in-part of my prior copending application Ser. No. 9,937, filed Feb. 9, 1970 and now abandoned.

BACKGROUND OF THE INVENTION

1. Field of the Invention

The invention relates to a method of recovering and utilizing noil fibres and dissolved or dissolving wood materials from white water in the wood processing industry, especially in processing involving wood defibration. More particularly, the method relates to the recovery of such materials in the manufacture of paper or board, so that the recovered materials may be used as constituents of paper or board products, while the clarified water is suitable for recycling as fabrication water.

2. Description of the Prior Art

In the pulp and paper industry the term white water describes the water which drains off during the formation on a Fourdinier wire or the like of the pulp web which will constitute a paper or board product after further processing. This white water, sometimes referred to as "back" water, contains finely divided solid material in suspension, including so-called noil fibres and other components of the wood which was used to make up the pulp slurry.

Numerous methods are known for separating noil fibres from white water. These known methods are based on the use of various substances to cause precipitation, sedimentation or flotation. However, prior art efforts have been directed to the removal, or in some cases, recovery, of noil fibres only, leaving other dissolved and partially dissolved wood material in the white water. Accordingly, white water treated by prior art methods cannot be repeatedly recycled as fabrication water, and valuable raw material is lost with the waste water even in those cases where the noil fibres are recovered and not simply discarded. The resulting water pollution problems are notorious.

SUMMARY OF THE INVENTION

In accordance with the method of this invention, white water drawn from an industrial process is first treated to regulate the pH of the white water, by the addition of a pH regulating substance. The pH regulating substance may be either acidic or alkaline, but in the more common applications, the pH of the white water is raised at this stage by the addition of an alkaline additive, NaOH being particularly suitable as a pH raising agent.

Next, a glue-like material or combination of coagulating materials is added to the white water. The coagulating materials do not coagulate or form flocks immediately, since the previous regulation of the pH has served to produce a pH level at which such coagulation or flock formation does not occur. Preferably the coagulating materials are added in the form of weak solutions which stay in liquid form after being added to the white water. The coagulating materials added must be substances whose presence in a board or paper product is beneficial, or at least not deleterious to the quality of the product, since the coagulating materials will become constituents of the product along with the noil fibres and other wood substances recovered from the white water. Thermosetting resins are suitable coagulating materials. It has been found that phenol formaldehyde resin is well suited for use in the method of the invention. Other suitable coagulating materials include urea formaldehyde, melamine, carboxymethylcellulose (CMC), linseed oil emulsion, polyvinylchloride-latex emulsion and acrylic latex emulsion.

After adding the coagulating materials the white water is thoroughly mixed in order to promote uniform distribution of the noil fibres, soluble wood materials and the glue-like materials. A substantially uniform suspension is produced.

After the suspension has been well mixed, the pH of the suspension is again changed, in the opposite sense from the first change. Thus, if alkaline solutions were added at the outset, acid substances are added at this stage. The chemical additive, suspended solids, and dissolved materials precipitate. This change in pH and the resultant precipitation are usually achieved by the addition of a metallic salt, resulting in the formation of flocks of metallic hydroxides, to which the molecules of the suspended and dissolved materials adhere.

The suspension is then led to a fractionation basin where the flocks are separated by flotation and/or sedimentation. A fraction containing sludge is recycled for use as additional raw material, for example, by returning the sludge to a stage of paper or board production preceding the formation of the pulp web. By controlled admixture of the sludge with the pulp which is to form the web, the precipitated molecule agglomerations become coupled with ions of opposite charge in the pulp and constitute a water-permeable electrolytic filter in the pulp web.

A polyelectrolyte can be effectively added to the white water at one or more stages of the method according to the invention. Thus, when the coagulating agent is being mixed in the white water it is desirable to obtain a substantially homogenous suspension. The addition of polyelectrolyte at this stage has been found to improve the homogeneity of the suspension by bringing the molecules of the coagulating agent into more intimate contact with the suspended solids and dissolved wood materials in the white water. An anionic or cationic polyelectrolyte may be used depending upon the charge on the suspended materials.

The amount of polyelectrolyte added is relatively small. That is, the total amount of polyelectrolyte used would not itself alone be sufficient for effective removal and recovery of the noil fibres and soluble wood materials. It has been found that if polyelectrolytes alone are used for such recovery, the flocks or precipitates formed thereby are so thick and viscous that recovered materials cannot be effectively recycled to any stage of forming a pulp web. Small amounts of polyelectrolyte are added in the present invention for relatively fine regulation of the total charge on molecule agglomerates, not for the basic job of capturing the fibers, etc. as agglomerates.

A polyelectrolyte can also be introduced into the suspension at the stage of formation of flocks. The mose effective flock formation occurs near the isoelectric point. If, after the introduction of a pH affecting substance to the suspension to form the flocks further control is desirable, the addition of a polyelectrolyte can serve to speed up flock formation or to increase the size of flocks. Thus, after the addition of an acidic substance to lower the pH and cause flock formation a cationic polyelectrolyte can be added.

Another stage at which the addition of a polyelectrolyte can be advantageous is as an addition to sludge to be returned to the pulp which forms a pulp web.

The z-potential (i.e., the potential across the diffuse layer surrounding colloidal particles) of the pulp material is usually well below zero (−5mV to −30mV), so the sludge containing the recovered solids, dissolved materials, and flock forming chemicals adheres homogeneously to the fibres in the pulp suspension. However, if the difference in z-potentials between the sludge and the pulp suspensions is not great enough, a polyelectrolyte or the like having a charge opposite to that of the pulp suspension can be added to the sludge. The recycled sludge should not be as thick as possible, but can advantageously contain a considerable amount of water, so that the concentration of the pulp suspension can be regulated by the addition of the sludge-bearing water. The amount of polyelectrolyte to be added at any of these stages is relatively small compared to known processes, with a resultant saving in cost of materials.

Recycled sludge may also be used after the formation of a pulp web for surfacing of a paper or board product.

The cleared fraction of the white water, from which the wood materials have been removed, can be used for dilution of the pulp or as washing water or spray water. If necessary, the cleared water may be discharged into a recipient, such as a sewer, river or lake. If the water leaving the process by evaporation equals that which enters with the raw material and process additions, no water need be discharged to a recipient and the process may be entirely closed.

Since the aforementioned coagulating agents added to the white water become constituents of the final product, glue-like materials are chosen whose presence in the final product is beneficial. For example, highly condensed phenol-formaldehyde resin, urea resin, and melamine resin are suitable for use in the recovery of material from white water in the production of hardboard, semi-chemical board, fluting and carton board. Linseed oil emulsion is suitable for white water in hardboard, insulation board, and S2S board manufacture. Carboxymethylcellulose (CMC) may be advantageously used in treating white water in paper, pulp, ground wood and carton processes. Acrylic latex emulsion is suitable for treatment of white water in all of the above mentioned cases.

Polyvinylchloride-latex emulsion can be used for white water treatment in the production of insulation board, so long as the temperature does not reach the temperature at which PVC decomposes.

DESCRIPTION OF PREFERRED EMBODIMENTS

A preferred embodiment of the invention will be described with respect to the treatment of white water from manufacturing processes in an industry involving wood defibration, although the method of the invention is not limited to the treatment of such water but is applicable to other industrial process water.

In the preferred embodiment of the invention, a portion of such white water is withdrawn from the manufacturing process cycle and led to a first reactor where a sufficient quantity of an alkaline substance is added to prevent premature reaction of the suspended materials with flock forming materials subsequently added. Aqueous sodium hydroxide solution is suitable for this purpose.

The suspension then passes to a second reactor where coagulating chemicals are added. These additives will be retained in the final product when recovered material is recycled, so the coagulating substances are used which have a beneficial effect on the final board or paper product. Carboxymethylcellulose is particularly suitable in treating white water in paper manufacturing processes, and phenol-formaldehyde is particularly suitable in board making processes, but some other precipitate forming or flock forming agent which will not be deleterious to the final product quality may be used.

The coagulating substance is carefully mixed into the water in order to obtain as homogeneous a suspension as possible to promote uniform recovery of suspended solids and dissolved substances upon reaction.

The suspension then passes to a third reactor where the pH is lowered to permit the flock forming agents to react. An acid metallic salt is suitable for lowering the pH at this time. Aluminum sulphate and iron sulphate are preferred for this purpose. Large flocks of metallic hydroxide are formed, and the positive charge on the flocks attracts the negatively charged suspended solids and the molecule agglomerations formed by the coagulating substances.

This process can be enhanced by the addition of a suitable amount of a cationic polyelectrolyte or other similar substance such as a cationic connected starch. The agglomerates so formed have a sufficiently different z-potential from the pulp fed into the process that upon recycling, the recovered agglomerated material will become coupled with the ions in the pulp carrying a different charge to form a water permeable electrolytic filter in the pulp web.

After introduction of the precipitating agents the suspension may be passed to a clarification basin where the flocks rise to the surface and are readily separated from the cleared water. Heavy solids may sink to the bottom of the basin, whence they can be removed by means of a screw transporter or other suitable means. The recovered materials may be recycled to the board or paper making process, for example, by returning it to the forming machine where it can be mixed into the pulp.

The clarified water is suitable for recycling and reuse in the manufacturing process. Some of the water may be discharged to a recipient.

The following specific examples illustrate the method of the invention and its advantages. All percentages given are percentages by weight.

EXAMPLE I

Process water was treated according to the method of the invention in a hardboard factory in Europe as follows:

About 60 cubic meters of water per hour was led off for treatment from the water circulating in the hardboard making process. The water had a pH of 4.2 and included 2,300 mg/l of suspended solids (Whatman filter GF/A) as well as 18,400 mg/l of dissolved materials.

The water was made alkaline in the first reactor by adding 200–300 mg/l NaOH in the form of a 10% solution in water. The pH of the water rose to 8.0.

Highly condensed phenol-formaldehyde resin was added to the alkaline water in the second reactor. The quantity of resin added was 240 mg/l in the form of a solution of 10% resin in water. There was no precipitation at this stage because of the high pH of the water.

The next step was the addition of 600–800 mg/l of $Al_2(SO_4)_3 \cdot 18H_2O$ in a 10% solution in water. The pH of the solution went down to 5.3 and precipitation occurred. The positive charge on the $Al(OH_3)$ flocks formed by the NaOH and $Al_2(SO_4)_3$ attracted the negatively charged suspended solids as well as the molecule agglomerations formed by the phenol-formaldehyde resins with the dissolved materials to form large flocks.

Flock formation was accelerated and the z-potential of the flocks was brought as near zero as possible by the addition of a cationic polyelectrolyte to the precipitated suspension.

A sludge fraction was separated from the cleared water by removing the flocks from the surface in a separation basin. The flocks removed were recirculated back to the manufacturing process where they were added to the pulp. There was a sufficiently large difference in z-potentials between the sludge and the pulp that the flocks adhered homogeneously to the pulp and were retained through the manufacturing process as constituents of the final product.

The cleared water after separation of the sludge contained only about 100 mg/l of suspended solids and about 13,200 mg/l of dissolved material. Part of this cleared water was pumped back to the manufacturing process for use in dilution of the pulp and for other purposes which previously had required the use of fresh water. In order to maintain the water balance in the process it was necessary to discharge about 100–200 l/minute of cleared water to the recipient. Only 20% of the water entering the treatment plant was discharged to the recipient as cleared water, the suspended solid content of the water had been reduced by 95% and the dissolved material content by 20%, so the real purification capacity of the plant can be considered to be 66%.

When chips coming into the factory were low in moisture content (about 40% $H_2$), there was no need to discharge any water to the recipient and the plant acted as a "factory kidney" having a purification capacity of 100%.

The only effects of using recycled sludge as a constituent of the final product were beneficial in that the product was improved.

EXAMPLE II

A pilot plant test of the method of the invention was performed in a hardboard factory. The water entering the pilot plant contained:

| | |
|---|---|
| suspended solids | 356 mg/l |
| dissolved organic material | 4,542 mg/l |

As described in Example I, the pH of the water was raised to 8.0 by adding 60 mg/l of NaOH; 200 mg/l of phenol-formaldehyde resin was used as the glue-like material; and 430 mg/l of $Al_2(SO_4)_3 \cdot 18H_2O$ having a pH of 4.7 was used to precipitate the suspended and dissolved material.

The cleared water contained:

| | |
|---|---|
| suspended solids | 26 mg/l |
| dissolved organic material | 3,300 mg/l |

The sludge was recycled as an additive to the pulp with only beneficial effects. Thus, cross breaking strength was increased by 50%.

The phenol-formaldehyde resin used in Examples I and II was highly condensed. The resin was manufactured as follows: The condensation of formaldehyde and phenol was carried to a stage at which dimethylolyphenol was condensed into resole but not to resite. The viscosity at that point was 25–30 sec. (FC 6mm. 25°C). The viscosity was lowered to about 15 sec. (FC 6mm. 25°C) by adding NaOH. The resin may contain a maximum of 0.2% free phenol, but preferably contains no free phenol.

Ordinary fibreboard resins (formaldehyde-phenol resins) have been tested for use in treating white water from fibre board mills in the described manner, with positive results, but the consumption of such resins has been found to be at least twice that of the preferred highly condensed resin, which is particularly well adapted for use in the method of the invention in hardboard mills.

EXAMPLE III

Successful experiments have been made on a laboratory scale, following the method of Example I and II, but substituting urea and melamine resins for the highly condensed phenol-formaldehyde resin.

EXAMPLE IV

Pilot plant tests were conducted in a factory making S2S board. The method was similar to that of Examples I–III. NaOH was used to raise the pH of the white water, and $Al_2(SO_4)_3$ and $FeSO_4$ were used as precipitating agents. Three coagulating agent were tested: linseed oil emulsion; PVC-latex emulsion; and acrylic latex emulsion. It was found that when linseed oil emulsion was used, the pH had to be raised to almost 9 in the initial alkalization stage in order to achieve good results in removing suspended solids and dissolved material. With PVC and acrylic latexes, it was only necessary to add sufficient NaOH to raise the pH level to between 7 and 8.

The sludge was returned to the process and its only effects on the board product were beneficial. The water discharged from the pilot plant was used in processing without any difficulties.

EXAMPLE V

Pilot plant runs according to the method of the invention were performed on the paper machine of the Centrallaboratorium Inc., Helsinki, Finland. White water from the manufacture of the following types and grades of paper were treated: newsprint, reel printing paper, typewriting paper, duplicating paper, parchment raw paper, punch card, carton fluting and sack paper.

On the average, one-third of the white water was circulated through the pilot plant for treatment, the other two-thirds being circulated in a short cycle without passing through the pilot plant. In the treatment of white water resulting from the manufacture of fluting paper and sack paper, an aqueous solution of CMC and phenol-formaldehyde resins was used. In all other cases, a 1% solution of CMC in water was used. NaOH was used to raise the pH of the white water to 7.0 in the initial treatment stage, and $Al_2(SO_4)_3$ was used to lower the pH to 4.5 after the addition of the resin or resins.

The sludge fraction was returned to the manufacturing process through the pulper. Paper quality was tested and no detrimental effects on paper quality were found to result from the recycling of sludge. On the contrary, the tearing strength of sack paper and fluting carton was increased because of the CMC and phenol formaldehyde resins used.

The cleared water was completely clear, so that it was entirely suitable for use as a spray water.

EXAMPLE VI

Pilot plant runs with the method of the invention were made in a factory producing special papers. White water from the manufacture of the following paper types and grades was treated according to the invention: parchment raw paper, duplicating paper, OP-parchment raw paper, punch card carton, offset paper, cable paper.

carboxymethylcellulose (CMC) was the only coagulating agent used. The quantity of CMC was 25 mg/l. For precipitation, $Al_2(SO_4)_3$ was used to lower the pH to 4.5.

White water from colored quality papers was successfully treated and no color was observed in the cleared fraction after treatment. Between 95% and 99% of the solids suspended in the white water were recovered.

PURIFICATION AND ENVIRONMENTAL PROTECTION

The following example illustrates how the method of the invention reduces water pollution.

White water circulating in a manufacturing process carried a load of 400 kg/h of soluble organic substances. Some of this white water was returned to the process in a short cycle and a quantity of white water was drawn off for treatment. The quantity of white water treated was 100 m³/h and this white water carried a concentration of 10 kg/m³ of soluble organic material. Treatment according to the invention was carried out and the white water was separated into two fractions for recycling. One fraction consisting of precipitated solids (sludge) amounting to 250 kg/h was recycled and used as a constituent of the product. The other fraction recycled was cleared water, which was returned to the process. The total quantity of recycled cleared water and precipitated solids plus cleared water was 80 m³/h, so only 20 m³/h of clarified water was discharged to the recipient from the treatment process. This small amount of effluent water was all that was necessary to maintain the water balance of the manufacturing process.

The low costs involved in the process make it an extremely attractive solution to the problem of water pollution. The operating costs include the price of the chemicals added to the white water, electricity, maintenance, etc., but these costs are offset to a large extent by the value of the sludge returned as a constituent of the product, since raw material costs are so high. In some cases it has been found that reclaimed sludge was equal in value to the cost of the chemical additives. A further consideration is the improved quality of the product. Since the process may take place at high temperatures, there is a considerable saving in heat energy.

Any water which is eventually discharged is substantially free of noil fibres and either free of soluble organic materials or contains only a decreased amount of soluble organic materials, so its effect in the recipient is minimal. This result is highly desirable in view of environmental protection legislation and increased public awareness of ecology.

What is claimed is:

1. A method of recovering noil fibres and soluble wood material in white water from a manufacturing process involving the formation of a pulp web by separating flocked out material from water to produce cleared water and returning the material flocked out to the pulp web for retention as a beneficial constituent of the manufactured product, comprising: Adding a sufficient quantity of an alkaline substance to white water to prevent premature coagulation of suspended material; then adding as a coagulating agent a material whose presence in the pulp web formed is beneficial selected from the group consisting of phenol-formaldehyde resin, carboxymethylcellulose, urea resin, melamine, linseed oil emulsion, polyvinylchloride-latex emulsion and acrylic latex emulsion; thoroughly mixing said white water with said coagulating agent to obtain a substantially homogeneous suspension; after said mixing, adding a sufficient quantity of an acidic substance to the suspension to lower the pH to form flocks incorporating said coagulating agent, noil fibres and soluble wood material from the white water; separating water from said flocks by gravity separation to obtain cleared water and recycling most of the cleared water for use in manufacturing processes; and returning the flocks to the pulp web to form constituent material in the final product of the manufacturing process.

2. The method of claim 1 wherein the acidic substance is a metallic salt.

3. The method of claim 1 and including separating the cleared water into two fractions, one fraction being recycled and used as fabrication water, the other fraction being discharged to a recipient, and wherein the amount of water discharged is only that necessary to maintain the water balance of the manufacturing process.

4. The method of claim 1 wherein such quantities of said alkaline substance and of said acidic substance are added that said flock formation occurs near the isoelectric point.

5. The method of claim 1 and including the addition of a polyelectrolyte for fine regulation of total charges on the suspended materials.

6. A method of recovering noil fibres and soluble wood material in white water from a manufacturing process involving the formation of a pulp web by separating flocked out material from water to produce cleared water and returning the material flocked out to the pulp web for retention as a beneficial constituent of the manufactured product, comprising: adding a sufficient quantity of an acidic substance to white water to prevent premature coagulation of suspended material; then adding as a coagula-agent a meterial whose presence in the pulp web formed is beneficial selected from the group consisting of phenoformaldehyde resin, carboxymethylcellulose, urea resin, melamine, linseed oil emulsion, polyvinylchloride-latex emulsion and acrylic latex emulsion; thoroughly mixing said white water with said coagulating agent to obtain a substantially homogeneous suspension; after said mixing, adding a sufficient quantity of an alkaline substance to the suspension to raise the pH to form flocks incorporating said coagulating agent, noil fibres and soluble wood material from the white water; separating water from said flocks by gravity separation to obtain cleared water and recycling most of the cleared water for use in manufacturing processes; and returning the flocks to the pulp web to form constituent material in the final product of the manufacturing process.

* * * * *

UNITED STATES PATENT OFFICE
CERTIFICATE OF CORRECTION

PATENT NO. : 3,873,418
DATED : March 25, 1975
INVENTOR(S) : Esko Kai Brax

It is certified that error appears in the above-identified patent and that said Letters Patent are hereby corrected as shown below:

| | | |
|---|---|---|
| Col. 1, | line 56; | "glue-like" should read --coagulating--. |
| Col. 7, | line 10; | "phenol" should read --phenol- --; |
| | line 23; | "carboxymethylcellulose" should read --Carboxymethylcellulose--. |
| Col. 8, | line 63; | (Claim 6) "coagula-agent" should read --coagulating agent--, and "meterial" should read --material--; |
| | line 65; | "phenoformaldehyde" should read --phenol-formaldehyde--. |

Signed and sealed this 1st day of July 1975.

(SEAL)
Attest:

RUTH C. MASON
Attesting Officer

C. MARSHALL DANN
Commissioner of Patents
and Trademarks